United States Patent [19]
Bonney

[11] 4,177,834
[45] Dec. 11, 1979

[54] ROTARY FOUR WAY TANDEM CENTER VALVE

[76] Inventor: Roland W. Bonney, R.F.D. 1, Box 65, Kennebunkport, Me. 04046

[21] Appl. No.: 9,485

[22] Filed: Feb. 5, 1979

[51] Int. Cl.² .............................................. F16K 11/07
[52] U.S. Cl. .......................... 137/625.23; 137/625.24; 251/283
[58] Field of Search ...................... 137/625.23, 625.21, 137/625.24; 251/283; 91/467

[56] References Cited
U.S. PATENT DOCUMENTS

| | | | |
|---|---|---|---|
| 2,234,322 | 3/1941 | Sicard | 137/625.23 |
| 2,946,348 | 7/1960 | North | 251/283 X |
| 4,027,697 | 6/1977 | Bonney | 137/625.23 X |

*Primary Examiner*—Alan Cohan
*Attorney, Agent, or Firm*—William Nitkin

[57] ABSTRACT

A rotary four way tandem center valve including a spool member provided with a central spool projection with four axially extending grooves in its outer peripheral surface and two intersecting channels defined therein, a first and second operation port, an inlet and outlet port, and means for directing pressure passing from the inlet port to the outlet port to a selected one of said operation ports while at the same time relieving pressure in the other operation port.

3 Claims, 3 Drawing Figures

ROTARY FOUR WAY TANDEM CENTER VALVE

BACKGROUND OF THE INVENTION

1. Field of the Invention

This invention relates to valves and more particularly to rotary spool valves.

2. Description of the Prior Art

Spool valves for utilization with hydraulic control systems including the use of four way valves are well-known in the prior art. The inventor of the present invention has received three prior U.S. patents in this area, namely U.S. Pat. No. 3,774,504 for a Sliding Spool Valve; U.S. Pat. No. 4,027,697 for a Rotary Valve; and U.S. Pat. No. 4,124,038 for a Multi-way Hydraulic Valve. These patents and the references cited therein are related to the field in which the present invention resides.

SUMMARY

The present invention is a rotary four way tandem center spool valve which incorporates a flow through design feature useful in systems with pressure occurring beyond the instant valve.

It is an object of this invention to provide a valve of simple and economical construction in which it is not necessary to utilize check members such as ball checks. However, if desired, ball checks could be used in an alternate embodiment if positive device line locking is desired.

It is a further object of this invention to provide a valve with which other valves can be utilized beyond or between the valve of this invention and the tank without affecting the valve of this invention. In its preferred form the valve comprises a valve housing having a cylinder bore defined therein containing a rotatably movable spool member, the ends of which are in fluid-tight relation to the valve housing and which spool member is provided with a central spool projection whose peripheral surface is adapted to make fluid-tight contact with the sides of the housing around the cylindrical bore. The central spool projection is provided with four axially extending grooves on its peripheral surface. On either side of the central spool projection are defined a first and second pressure chamber, each of said chambers communicating to a respective first and second operation port. The operation ports are adapted for interconnection to the device, i.e., cylinder, etc. to be operated by the valve. Alternate of said grooves communicate with the first or second pressure chamber respectively. Further defined within the valve housing are an inlet port and outlet port which open into the cylindrical bore in the area occupied by the central spool projection and are, in a preferred embodiment, at right angles to one another. Also in a preferred embodiment the axially extending grooves are positioned around the periphery of the spool projection at 90 degree intervals to one another with the grooves diametrically opposite one another communicating to the same pressure chamber. Further defined within the central spool projection extending through the central spool projection are a first and second spool channel which are disposed at right angles to one another and whose end openings at the outer peripheral surface of the spool projection are each defined between respective grooves.

In operation the spool may be rotated so that the first and second channels which intersect one another align with the inlet port and the outlet port so that the fluid enters from the inlet port and passes through the channels in the spool to exit through the outlet port. If one wishes to activate the valve, one rotates the spool 45 degrees and a groove associated with one of the pressure chambers is now aligned with the inlet port thereby pressurizing the device interconnected with that pressure chamber's operation port while at the same time the groove associated with the other pressure chamber is aligned with the outlet port thereby allowing pressure to be relieved within the device associated with that pressure chamber's operation port as the fluid passes out to the tank.

Sealing means such as O-rings or equivalent can be provided at the ends of the spool to assist in forming its fluid-tight relation with the valve housing. Conventional means to retain the spool within the valve housing can also be provided such as a lock ring affixed to a groove in a section of the spool which may protrude from the valve housing or other well-known methods of retaining the spool within the housing can be utilized. Opposite the inlet port and outlet port there can be balance slots defined within the valve housing to assist in causing equalization of pressure around the spool at all times so that it will rotate easily.

The objects and design of the instant invention will become clearer with reference to the following drawings and Description of the Preferred Embodiment below.

DESCRIPTION OF THE PREFERRED EMBODIMENT

Figure 1:
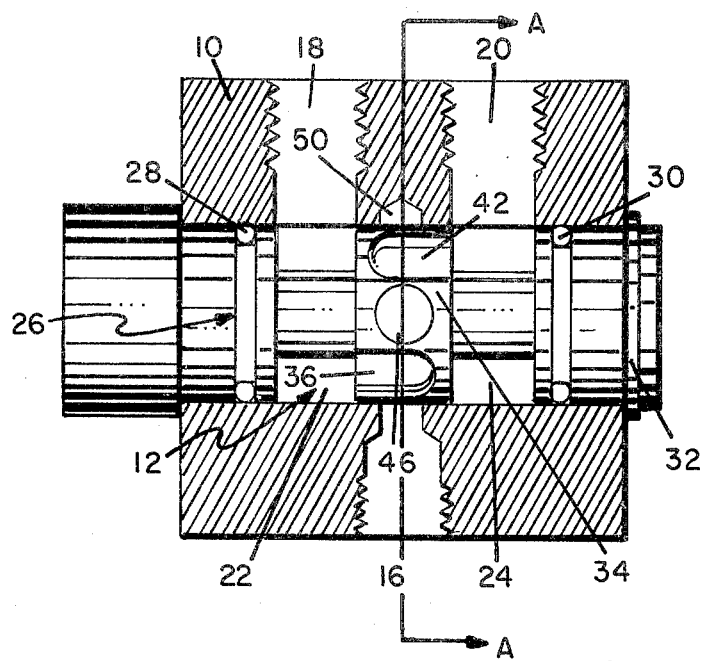
FIG. 1 discloses a cross-section through the valve housing with the spool in place being shown as a completed structure and not in half-section.
Figure 2:
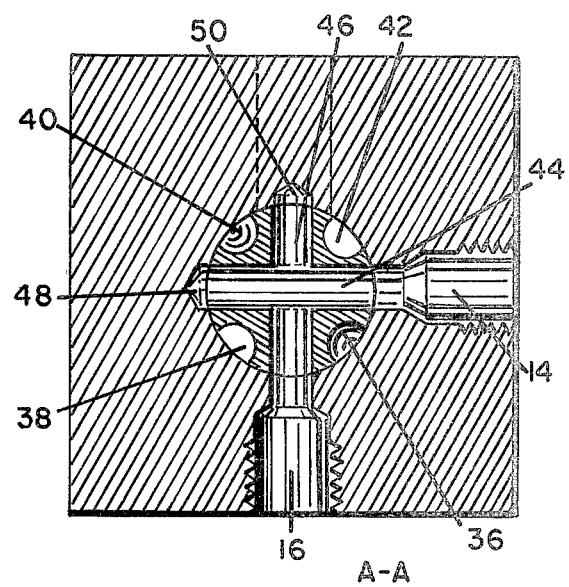
FIG. 2 illustrates a cross-sectional view through A—A of FIG. 1.
Figure 3:
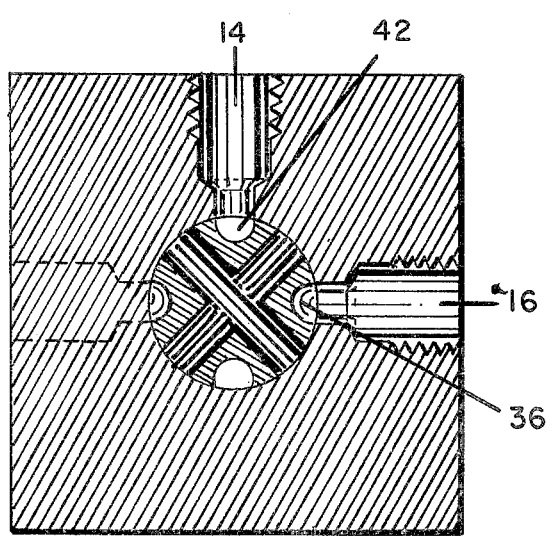
FIG. 3 illustrates a similar view as FIG. 2 but with the spool in an alternate position and with a ball check illustrated in outline form.

FIG. 1 illustrates the device of this invention having a valve housing 10 with cylindrical bore 12 defined therein. Valve housing 10 also contains inlet port 14 illustrated in FIG. 2 and outlet port 16, both of which enter into cylindrical bore 12 and are substantially in the same plane transverse to the axis of the cylindrical bore and positioned at right angles to one another. Also defined within the cylindrical bore are a first operation port 18 and second operation port 20 which are located on opposite sides of the transverse plane of the outlet and inlet ports and which communicate into the cylindrical bore being in the same plane as, and directly opposite to, outlet port 16. Within cylindrical bore 12 is located rotary spool 26 which at either end thereof is of a diameter adapted to contact the cylindrical bore in a fluid-tight relationship. If desired, sealing means such as a first O-ring 28 and second O-ring 30 can be utilized within grooves defined within the spool to assist in forming such fluid-tight relationship between the spool and the valve housing. The spool is rotatable within the valve housing and can be retained therein by conventional means such as by a lock ring 32 which is mounted within a groove of the segment of the spool which may protrude out of the valve housing or by equivalent conventional means. The spool can be manually rotated or rotated by other conventional means as desired and may include stop members to limit its rotational movement and detents for determination by the user as to the rotated position of the spool within the valve. The spool may be self-centering in a neutral position by spring members or by other well-known conventional means. Positioned on a central portion of the spool aligned with the transverse plane of the inlet and outlet ports is the central spool projection 34 whose periphery is adapted to make fluid-tight contact with the sides of the cylindrical bore. On either side of the central spool projection the spool is of smaller diameter than the cylindrical bore forming a first pressure chamber 22 and a second pressure chamber 24. The first pressure chamber 22 and the second pressure chamber 24 communicate with the first operation port 18 and the second operation port 20, respectively. Defined on the outer peripheral surface of central spool projection 34 are a series of four axially extending grooves 36, 38, 40 and 42, each of substantially equal area. Each of said grooves is positioned equidistant from one another around said periphery whereby groove 42 is directly opposite groove 38, and groove 36 is directly opposite groove 40 so that a line from groove 36 to groove 40 and a line from groove 42 to groove 38 would intersect at right angles. Grooves 42 and 38 extend only to, and enter, the second pressure chamber 24 and grooves 36 and 40 extend only to, and enter, first pressure chamber 22. Further defined within the central spool projection and best seen in FIGS. 2 and 3 are a first channel 44 and a second channel 46 intersecting one another at right angles, the openings of each channel being positioned on the peripheral surface of the central spool projection, each between two grooves. These channels are aligned with the transverse plane of the inlet and outlet ports and intersect so that when the spool is rotated, aligning for example in FIG. 2 channel 44 with the inlet port, fluid will pass into channel 44 and then pass through channel 46 to escape through outlet port 16. When the spool is rotated so that a groove aligns with inlet port 14, one operation port will be pressurized and the other pressure port will be relieved of pressure. For example, if the spool is rotated so that groove 42 aligns with the inlet port and groove 36 aligns with the outlet port as seen in FIG. 3, then pressure will pass through the inlet port through groove 42 into the second pressure chamber 24 and then through the second operation port 20 to the device being operated. Alternately, groove 36, being aligned with the outlet port, allows the pressure within the first operation port to pass through the first pressure chamber through groove 36 and out the outlet port 16. As can be seen, the spool can be operated by the rotation of the spool 45 degrees in either direction since, if one wished to operate the operation ports in the opposite manner as described below, one would rotate the spool so that groove 38 aligned with the outlet port and groove 36 aligned with the inlet port thereby pressurizing the first pressure chamber and first operation port and relieving the pressure within the second pressure chamber and second operation port. Groove 40 is unnecessary for use to pressurize or relieve the operation ports but is necessary for pressure balance around the spool. Uneven pressure around the spool can force the spool against the housing within the cylindrical bore. Therefore means to balance the pressure are incorporated within the valve of this invention, being balance slots 48 and 50 seen in FIG. 2. These slots in conjunction with the otherwise unused groove 40 allow for even pressures around the spool so that the spool can be turned freely.

It should be noted that the first and second operation ports can be positioned anywhere on the valve that can allow them to open into the first and second pressure chambers, i.e., they could be on opposite sides of the valve if desired.

Although the present invention has been described with reference to particular embodiments, it will be apparent to those skilled in the art that variations and modifications can be substituted therefor without departing from the principles and spirit of the invention.

I claim:

1. A rotary four way tandem center valve comprising:
   a valve housing;
   a cylindrical bore defined in said valve housing;
   an inlet port defined in said valve housing communicating into said cylindrical bore adapted to allow the entrance of hydraulic fluid into said cylindrical bore;
   an outlet port defined in said valve housing communicating into said cylindrical bore adapted to allow the escape of hydraulic fluid from said cylindrical bore;
   a first and second operation port defined in said valve housing, each communicating into said cylindrical bore;
   a spool member rotatably positioned within said cylindrical bore;
   a spool projection member extending around and projecting from said spool member, adapted so that its outer periphery contacts said valve housing within said cylindrical bore;
   a first and second pressure chamber defined within said cylindrical bore, one on each side of said central spool projection member into which said first and second operation ports communicate respectively;
   a first and second axial groove defined opposite one another on the periphery of said central spool projection member, each extending toward and communicating with said first pressure chamber;
   a third and fourth axial groove defined on the periphery of said central spool projection member, each positioned opposite one another, each extending toward and communicating with said second pressure chamber, said first, second, third, and fourth grooves adapted such that when said first groove is aligned with said inlet port, said third groove is aligned with said outlet port and when said second groove is aligned with said outlet port, said third groove is aligned with said inlet port; and
   a first and second channel intersecting one another defined within said central spool projection member, adapted such that when said first channel is rotated to be in communication with said inlet port, said second channel is in communication with said outlet port.

2. The valve of claim 1 further including a first and second balance slot defined in said valve housing within said cylindrical bore opposite said outlet port and said inlet port, respectively.

3. The valves of claims 1 or 2 further including fluid sealing means between said spool and said valve housing at each end of said spool.

* * * * *